United States Patent [19]

Morozumi et al.

[11] Patent Number: 4,787,991
[45] Date of Patent: Nov. 29, 1988

[54] RESIN COMPOSITION HAVING LUBRICATING PROPERTIES

[75] Inventors: Mituharu Morozumi, Yokohama; Masaki Egami, Yokkaichi, both of Japan

[73] Assignee: Asahi Glass Company Ltd., Tokyo, Japan

[21] Appl. No.: 919,389

[22] Filed: Oct. 16, 1986

[30] Foreign Application Priority Data

Oct. 18, 1985 [JP] Japan ................................ 60-230955

[51] Int. Cl.$^4$ ................ C10M 139/04; C10M 155/02
[52] U.S. Cl. .................................. 252/12.4; 252/12.0; 252/12.2; 252/12.6; 252/25; 252/28; 252/29; 252/49.6
[58] Field of Search ............... 252/12.0, 12.2, 12.4

[56] References Cited

U.S. PATENT DOCUMENTS

| | | | |
|---|---|---|---|
| 3,453,208 | 7/1969 | Gallagher et al. | 252/12.4 |
| 3,850,821 | 11/1974 | Horikawa | 252/12.2 |
| 3,994,814 | 11/1976 | Cairns | 252/12.2 |
| 4,011,189 | 3/1977 | Keil | 252/12 |
| 4,048,370 | 9/1977 | Orkin et al. | 252/12 |
| 4,080,233 | 3/1978 | McCloskey et al. | 252/12.4 |
| 4,100,245 | 7/1978 | Horikawa et al. | 252/12 |
| 4,532,054 | 7/1985 | Johnson | 252/12.4 |
| 4,575,430 | 3/1986 | Periard et al. | 252/12.4 |
| 4,623,590 | 11/1986 | Hodes et al. | 252/12.4 |
| 4,626,365 | 12/1986 | Mori | 252/12.4 |

*Primary Examiner*—William R. Dixon, Jr.
*Assistant Examiner*—Ellen McAvoy
*Attorney, Agent, or Firm*—Oblon, Fisher, Spivak, McClelland & Maier

[57] ABSTRACT

A resin composition having lubricating properties, which comprises 100 parts by weight of a synthetic resin, from 0.5 to 20.0 parts by weight of an organopolysiloxane and from 0.5 to 20.0 parts by weight of a fluorine-containing rubber or from 0.05 to 7.0 parts by weight of a trimethoxysilane, wherein at least one of said organopolysiloxane, fluorine-containing rubber and trimethoxysilane has a functional group.

19 Claims, No Drawings

RESIN COMPOSITION HAVING LUBRICATING PROPERTIES

BACKGROUND OF THE INVENTION

1. Field of the Invention

The present invention relates to a resin composition having lubricating properties.

2. Description of the Prior Art

Among various synthetic resins, thermoplastic resins such as polypropylene, polyethylene, polyamide, polycarbonate, polyvinyl chloride, ABS resin and EVA resin, and engineering plastics having good heat resistance and excellent mechanical strength, such as polyphenylene sulfide (PPS) and modified polyphenylene oxide (PPO), are poor in the self-lubricating properties although they have good frictional properties. They have better lubricating properties than rubber, but they are still substantially inferior to tetrafluoroethylene resins and can not be regarded as being useful as lubricating materials. In order to improve the lubricating properties of these synthetic resins, various methods have been employed wherein a fine powdery solid lubricant such as a tetrafluoroethylene resin, graphite, molybdenum disulfide or boron nitride, a synthetic oil such as silicone oil or fluorinated oil which is liquid at normal temperature, a natural oil such as a mineral oil, or a lubricating coating material comprising the above-mentioned lubricant and a binder, is incorporated in a resin or is coated on the surface of the resin. However, the method of incorporating the solid lubricant or liquid oil to the resin, has problems such that uniform dispersion of the additives is difficult, and the intrinsic properties of the synthetic resin as the substrate are likely to deteriorate. Thus, no adequate lubricating properties have been imparted. On the other hand, the method of applying such a lubricating agent on the surface of the resin to form a coating film having lubricating properties, has had drawbacks such that the formed coating film has poor abrasion resistance and is susceptible to peeling.

Thus, conventional synthetic resins having various excellent properties have a problem that they are not suitable for use as a sliding material which is required to have a low friction and excellent abrasion resistance.

SUMMARY OF THE INVENTION

In order to solve the above problem, the present invention provides a resin composition having lubricating properties, which comprises 100 parts by weight of a synthetic resin, from 0.5 to 20.0 parts by weight of an organopolysiloxane and from 0.5 to 20.0 parts by weight of a fluorine-containing elastomer or from 0.05 to 7.0 parts by weight of an alkoxysilane, wherein at least one of said organopolysiloxane, fluorine-containing elastomer and alkoxysilane has a functional grop.

Now, the present invention will be described in detail with reference to the preferred embodiments.

Firstly, in the present invention, the synthetic resin is not restricted and may be a thermosetting or thermoplastic resin. For instance, there may be mentioned a phenol resin, a urea resin, a melamine resin, a melamine-phenol co-condensation resin, a xylene-modified phenol resin, a urea-guanamine co-condensation resin, an amino resin, an aceto-guanamine resin, a melamine-guanamine resin, a polyester resin, a diallyl phthalate resin, a xylene resin, an epoxy resin, a epoxy acrylate resin, a silicone resin, a urethane resin, polytetrafluoroethylene, polychlorotrifluoroethylene, a tetrafluoroethylene-hexafluoropropylene copolymer, a tetrafluoroethylene-perfluoroalkylvinyl ether copolymer, a vinylidene fluoride resin, an ethylene-tetrafluoroethylene copolymer, an ethylene-chlorotrifluoroethylene copolymer, a vinyl chloride resin, a vinylidene chloride resin, a polyethylene (low density, high density or ultra high molecular weight), a chlorinated polyolefin, a polypropylene, a modified-polyolefin, a moisture-crosslinkable polyolefin, an ethylene-vinyl acetate copolymer, an ethylene-ethyl acrylate copolymer, a polystyrene, an ABS resin, a polyamide methacrylate resin, a polyacetal, a polycarbonate, a cellulose resin, a polyvinyl alcohol, a polyurethane elastomer, a polyimide, a polyamide imide, an ionomer resin, a polyphenylene oxide, a methylpentene polymer, a polyaryl sulfone, a polyaryl ether, a polyphenylene sulfide, a polysulfone, an aromatic polyester, a polytetramethylene terephthalate, a polybutylene terephthalate, a thermoplastic polyester elastomer, and a blend of various polymer substances.

DETAILED DESCRIPTION OF THE PREFERRED EMBODIMENTS

Now, the organopolysiloxane in the present invention may be a homopolymer or a copolymer of an organosiloxane such as dimethylsiloxane, methylphenylsiloxane or methyltrifluoropropylsiloxane. This organopolysiloxane preferably contains in its molecule a functional group such as an amino group, a glycidyl group, a carboxyl group or an alcoholic hydroxyl group. Specific examples will be given below:

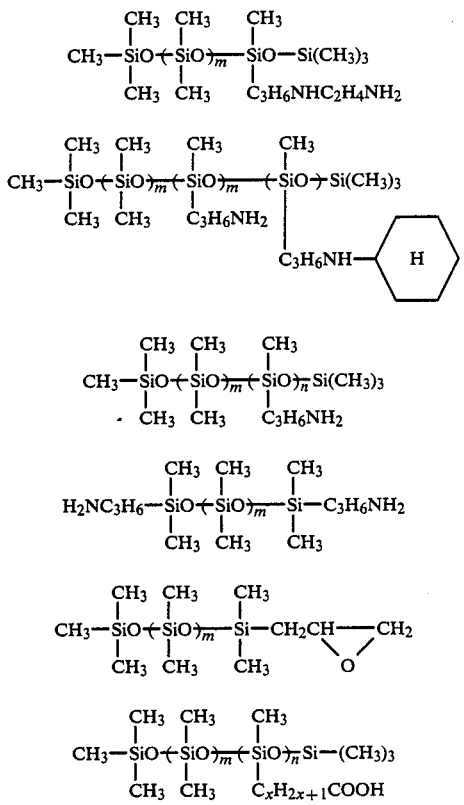

-continued

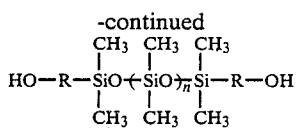

wherein R is an alkylene group, X is an integer of at least 1, m=50 to 10,000, and n=20 to 50.

The fluorine-containing elastomer in the present invention is an elastomer containing at least one type of polymer units of a fluorine-containing olefin. An elastomeric polymer comprising at least two types of polymer units, is preferred. As such a fluorine-containing elastomer, there may be mentioned a two component copolymer such as a tetrafluoroethylene-propylene copolymer, and a three component tetrafluoroethylene-propylene copolymer comprising units containing glycidyl ether groups as reaction sites. Further, there may be mentioned a tetrafluoroethyleneperfluoroalkylperfluorovinyl ether copolymer, a vinylidene fluoride-hexafluoropropylene copolymer, a vinylidene fluoride-pentafluoropropylene copolymer, a vinylidene fluoride-trifluorochloroethylene copolymer, a tetrafluoroethylene-ethylene-isobutylene copolymer, an ethylene-hexafluoropropylene copolymer, a tetrafluoroethylene-butene-1 copolymer and a tetrafluoroethylene-ethyl vinyl ether copolymer. In such fluorine-containing elastomers, the proportions of the respective components can be selected within wide ranges so far as elastomeric copolymers are obtainable. For instance, there may be mentioned a copolymer comprising from 40 to 70 mol % of tetrafluoroethylene and from 30 to 60 mol % of propylene, a copolymer comprising from 50 to 90 mol % of vinylidene fluoride, from 10 to 50 mol % of hexafluoropropylene and from 0 to 30 mol % of tetrafluoroethylene, a copolymer comprising from 30 to 90 mol % of tetrafluoroethylene and from 10 to 70 mol % of perfluoroalkylperfluorovinyl ether, and a copolymer comprising from 50 to 90 mol % of vinylidene fluoride and from 10 to 50 mol % of pentafluoropropylene. Such fluorine-containing elastomers may of course contain in addition to the above-mentioned component units and reaction sites, other suitable units (for example, the tetrafluoroethylene-propylene copolymer may contain units of e.g. vinylidene fluoride, ethylene, isobutylene, acrylic acid or its alkyl ester, hexafluoropropylene, trifluorochloroethylene, chloroethylvinyl ether or a perfluoroalkylvinyl ether). The reaction sites contained in the tetrafluoroethylene-propylene copolymer are composed of units containing glycidyl groups. Among them, glycidyl vinyl ether is most preferred. As other examples, glycidyl acrylate, acrylic acid, methacrylic acid and 2-chloroethyl vinyl ether, may be mentioned.

The fluorine-containing elastomers and organopolysiloxanes containing reaction sites, may be prepared by various methods. Usually, they may be readily prepared by copolymerizing the above-mentioned respective main component units with suitable reaction site units. Namely, it is possible to obtain a fluorine-containing elastomer composed of a reaction site-containing tetrafluoroethylene-propylene copolymer by copolymerizing a mixture of main component monomers such as tetrafluoroethylene and propylene with a monomer containing a glycidyl group. Likewise, it is possible to obtain a reaction site-containing organopolysiloxane by copolymerizing a main component such as dimethylsiloxane with a monomer containing an amino group, a glycidyl group, a carboxyl group or an alcoholic hydroxyl group as the reaction site. The number average polymerization degrees of the fluorine-containing elastomers and the organopolysiloxanes, may be varied within wide ranges. However, it is usual that the fluorine-containing elastomers have a number average polymerization degree of from 50 to 10,000, and the organopolysiloxanes have a number average polymerization degree of from 50 to 50,000.

In the present invention, the proportions of the reaction sites in the fluorine-containing elastomer and the organopolysiloxane, may be varied within wide ranges. However, it is usual that the reaction site units are selected within a range of from 0.01 to 20.0 mol %, preferably from 0.1 to 5.0 mols %, based on the total mols of the units constituting the respective molecules. The reaction sites contained in the fluorine-containing elastomer and in the organopolysiloxane, are useful for forming three-dimensional network structures by chemical reaction(s). If the proportions of the reaction sites are too small, the chemical reactions tend to hardly proceed. On the other hand, if the proportions are excessive, the networks tend to be too dense, whereby separation is likely to result. In each case, it becomes difficult to obtain excellent properties. Accordingly, the proportion of the reaction sites should be selected collectively taking into consideration the average polymerization degrees of the fluorine-containing elastomer and the organopolysiloxane, the types of the molecules and reaction sites thereof, the mixing molar ratio, etc.

The alkoxysilane in the present invention is optionally selected from commercially available silane coupling agents. However, a trimethoxysilane containing glycidoxy groups is most effective, and other alkoxysilanes are inferior in the effectiveness. As the trimethoxysilane containing glycidoxy groups, $\gamma$-glycidoxypropyltrimethoxysilane is mentioned as one of the most desirable silanes.

In the present invention, the organopolysiloxane is incorporated in an amount of from 0.5 to 20.0 parts by weight relative to 100 parts by weight of the synthetic resin, because if the organopolysiloxane is less than this range, no adequate effect for the improvement of the sliding properties is obtainable, and if it exceeds the upper limit, the mechanical properties of the synthetic resin deteriorate substantially. The preferred range is from 5 to 15 parts by weight. The reason why either the fluorine-containing elastomer in an amount of from 0.5 to 20.0 parts by weight or the alkoxysilane in an amount of from 0.05 to 7.0 parts by weight, is incorporated relative to 100 parts by weight of the synthetic resin, is that if the amount is less than the lower limit of the respective ranges, no adequate reaction with the organopolysiloxane can be attained, and the organopolysiloxane is likely to bleed out during the sliding operation, and the frictional condition tends to be unstable. On the other hand, if the amount exceeds the upper limit of the respective ranges, the mechanical properties of the synthetic resin deteriorates substantially. In a usual case, it is preferred that the fluorine-containing elastomer is within a range of from 5 to 15 parts by weight, and the alkoxysilane is within a range of from 1 to 5 parts by weight. With respect to the blending components, the three components of the organopolysiloxane, the fluorine-containing elastomer and the alkoxysilane, may be blended simultaneously to the synthetic resin. However, an adequate effect for the improvement of the properties can be obtained also by using only the organopolysiloxane and either the fluorine-containing elastomer or the alkoxysilane.

Conventional methods may be employed for mixing the above-mentioned composition of the present invention. For instance, the synthetic resin and the above described various components may separately be or may optionally be dissolved in a solvent such as a fluorochlorohydrocarbon, and then mixed by a mixing machine such as a Henschel mixer, a ball mill or tumbler mixer. Then, the solvent is removed, and the mixture is supplied to an injection molding machine or a melt-extruder having good melt-mixing efficiency or may preliminarily be melt-mixed by using heat rollers, a kneader, Bumbury's mixer or a melt-extruder. Further, there is no particular restriction as to the method for molding such a composition. However, compression molding, extrusion molding and injection molding are practical. Otherwise, a powder of the melt mixture pulverized by e.g. a jet mill or freeze pulverizer, may be used, by itself or after classified into a desired particle size fraction, for fluidized-bed coating or electrostatic powder coating.

The resin composition having lubricating properties of the present invention, may contain, in addition to the above-mentioned lubricating agents i.e. the fluorine-containing elastomer and organopolysiloxane, other additives which are commonly blended to synthetic resins, in such an amount not to impair the properties of the lubricating resin composition. As such additives, a releasing agent, a flame retardant and a weather resistance-improving agent may be mentioned. These additives may be incorporated simultaneously with the lubricating agents of the present invention. However, it is possible to employ a method wherein the additives and the lubricating agents are preliminarily mixed or formed into a graft copolymer elastomer before the incorporation. Furthermore, the above additives may be combined with conventional solid or liquid lubricants. As such lubricants, a tetrafluoroethylene resin powder, graphite, fluorinated graphite, talc, boron nitride, fluorine oil, silicone oil or other industrial lubricants may suitably be used depending upon the particular purpose.

Further, as a reinforcing material, conventional fiber material such as glass fiber, carbon fiber, alumina fiber, asbestos or rock wool, or an inorganic filler represented by e.g. glass powder, talc, clay or calcium carbonate, may be used. Furthermore, in so far as the lubricating properties of the lubricating resin composition of the present invention are not impaired, a modification may be applied to an intermediate product or to a final product by chemical or physical treatment for improvement of the properties.

It is believed that in the lubricating resin composition of the present invention, the co-existing organopolysiloxane and either the fluorine-containing elastomer or the alkoxysilane, are reacted to form a three dimensional network structure, or grafted so that networks having the lubricating properties of the organopolysiloxane are finely dispersed, whereby the frictional coefficient is small, and yet they remain in the structure without bleeding out of the base material, and thus the frictional coefficient can be maintained at a constant level.

Now, the present invention will be described in further detail with reference to Examples. However, it should be understood that the present invention is by no means restricted to these specific Examples.

The starting materials used in the following Examples and Comparative Examples, are as follows. The symbols in the bracket [ ] indicates abbreviations.
(1) Polyethylene (HIZEX 1300J, manufactured by Mitsui Petrochemical Industries, Ltd.), [PE]
(2) Nylon 12 (Diamide L 1640 P, manufactured by Daicel Chemical Industries, Ltd.), [PA 12]
(3) Nylon 66 (AMILAN CM 3001 N, manufactured by Toray Industries, Inc.), [PA 66]
(4) Polyacetal (Juracon M 90-02, manufactured by Polyplastic K.K.), [POM]
(5) Polybutylene terephthalate (Novadur 5010, manufactured by Mitsubishi Chemical Industries, Co., Ltd.), [PBT]
(6) Polyphenylene sulfide (Ryton P-4, manufactured by U.S. Phillips Petroleum Co.), [PPS]
(7) Polyether imide (Ultem 1000, manufactured by U.S. General Electric Co.), [PEI]
(8) Ethylene tetrafluoroethylene copolymer (Aflon COP C-88A, manufactured by Asahi Glass Company Ltd.), [COP]
(9) Polyimide resin (Polyamide bismaleimide C 183, manufactured by Technoschmie Co., West Germany), [PMBM]
(10) Amino group-containing organopolysiloxane (viscosity at 25° C.: 3500 cst, amine equivalent: 2000)
Chemical structure:

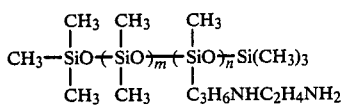

(11) Glycidyl group-containing organopolysiloxane (viscosity at 25° C.: 7500 cst, epoxy equivalent: 4000)
Chemical structure:

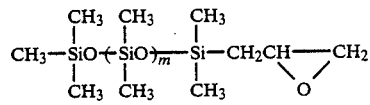

(12) Carboxyl group-containing organopolysiloxane (viscosity at 25° C.: 3000 cst, carboxyl equivalent: 3800)
Chemical structure:

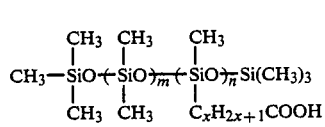

(13) Alcoholic hydroxyl group-containing organopolysiloxane (viscosity at 25° C.: 96 cst, hydroxyl equivalent: 20)
Chemical structure:

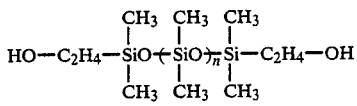

(14) Fluorine-containing elastomer (elastomeric copolymer composed of tetrafluoroethylene-propylene-glycidyl vinyl ether in a molar ratio of 54:43:2 having a mooney viscosity of 60-MLI+4 (at 100° C.))

(15) Alkoxysilane (γ-glycidoxy propyl trimethoxysilane, A 187, manufactured by Nihon Unika K.K.)
(16) Tetrafluoroethylene resin (Teflon 7J, manufactured by Mitsui DuPont Fluorochemical Co., Ltd.)
(17) Moisture crosslinkable polyethylene (moisture crosslinkable polyethylene, Linklon HF 700 N: 95 parts by weight and Linklon HZ 051: 5 parts by weight, manufactured by Mitsubishi Petrochemical Co., Ltd.)

EXAMPLES 1 to 14

As the synthetic resin, Nylon 12 [PA 12] (2) was selected. To 100 parts by weight of this resin, organopolysiloxane (11), (12) or (13) and fluorine-containing elastomer (14) or alkoxysilane (15) were blended as lubricating agents in the proportions as identified in Table 1, and the mixture was thoroughly mixed by a Henschel mixer, and then supplied to a double-screw melt-extruder, and extrusion, granulation and injection molding were conducted under melt-mixing conditions (cylinder temperature: 190° C., screw rotational speed: 100 rpm) and under injection molding conditions (cylinder temperature: 210° C., injection molding pressure: 900 kg/cm$^2$, mold temperature: 70° C.).

TABLE 1

| | Amounts (parts by weight) of blend components relative to 100 parts by weight of synthetic resin | | | | | |
|---|---|---|---|---|---|---|
| | Organopolysiloxane | | Fluorine-containing elastomer | | Alkoxy-silane | |
| Example | Type of groups contained | Parts | Type | Parts | Type | Parts |
| 1 | Amino groups(10) | 9 | (14) | 9 | — | — |
| 2 | " | 3 | (14) | 9 | — | — |
| 3 | " | 15 | (14) | 9 | — | — |
| 4 | " | 9 | (14) | 3 | — | — |
| 5 | " | 9 | (14) | 15 | — | — |
| 6 | " | 8 | — | — | (15) | 1.2 |
| 7 | " | 8 | — | — | (15) | 0.5 |
| 8 | " | 8 | — | — | (15) | 5.0 |
| 9 | Glycidyl groups(11) | 9 | (14) | 9 | — | — |
| 10 | " | 8 | — | — | (15) | 1.2 |
| 11 | Carboxyl groups(12) | 9 | (14) | 9 | — | — |
| 12 | " | 8 | — | — | (15) | 1.2 |
| 13 | Hydroxyl groups(13) | 9 | (14) | 9 | — | — |
| 14 | " | 8 | — | — | (15) | 1.2 |

The injection-molded products include two types of test pieces i.e. cylindrical test pieces having an internal diameter of 14 mm, an outer diameter of 23 mm and a length of 13 mm and dumbell test pieces of type IV according to ASTM-D 638. The cylindrical test pieces were used for friction tests, and the dumbell test pieces were used for tensile tests. The respective test methods were as follows.

Friction and abrasion test method:

The friction coefficient was measured by a thrust-type friction tester at a sliding speed of 10 m/min under a load of 10 kg/cm$^2$, and the abrasion coefficient was measured by a thrust-type abrasion tester at a sliding speed of 32 m/min under a load of 3·1 kg/cm$^2$. In each case, the counter substrate was made of bearing steel SUJ-2 (quenched and grind-finished).

Tensile testing method:

The tensile strength was determined under a pulling rate of 5 mm with an inter-chucks distance of 64 mm in an atmosphere of 23±2° C.

The test results in Examples 1 to 14 are shown in Table 2.

TABLE 2

| Example | Friction coefficient | Abrasion coefficient × 10$^{-10}$ cm$^3$/kg · m | Tensile strength Kgf/cm$^2$ |
|---|---|---|---|
| 1 | 0.17 | 32 | 400 |
| 2 | 0.21 | 43 | 410 |
| 3 | 0.15 | 54 | 385 |
| 4 | 0.17 | 78 | 390 |
| 5 | 0.19 | 48 | 380 |
| 6 | 0.22 | 33 | 420 |
| 7 | 0.19 | 75 | 405 |
| 8 | 0.25 | 48 | 390 |
| 9 | 0.16 | 32 | 405 |
| 10 | 0.21 | 49 | 410 |
| 11 | 0.19 | 51 | 390 |
| 12 | 0.22 | 74 | 400 |
| 13 | 0.21 | 63 | 385 |
| 14 | 0.24 | 77 | 405 |

COMPARATIVE EXAMPLES 1 to 11

In the same manner as in Examples 1 to 14, various blend components were blended in the proportions as identified in Table 3, to 100 parts by weight of Nylon 12 [PA 12] (2) as the synthetic resin base material, and test pieces were prepared under the same melt-mixing conditions and injection molding conditions as in Examples 1 to 14. The tests were conducted in the same manner as the preceding Examples. The results obtained are shown in Table 4.

TABLE 3

| | Amounts (parts by weight) of blend components relative to 100 parts by weight of synthetic resin | | | | | |
|---|---|---|---|---|---|---|
| | Organopolysiloxane | | Flourine-containing elastomer | | Alkoxy-silane | |
| Comparative Example | Type of groups contained | Parts | Type | Parts | Type | Parts |
| 1 | — | — | — | — | — | — |
| 2 | Amino groups(10) | 0.1 | (14) | 9 | — | — |
| 3 | " | 25 | (14) | 9 | — | — |
| 4 | " | 9 | (14) | 0.1 | — | — |
| 5 | " | 9 | (14) | 25 | — | — |
| 6 | " | 8 | — | — | (15) | 0.01 |
| 7 | " | 8 | — | — | (15) | 8 |
| 8 | " | 8 | — | — | — | — |
| 9 | — | — | (14) | 8 | — | — |
| 10 | — | — | (14) | 8 | (15) | 1.1 |
| 11 | — | — | — | — | (15) | 1.2 |

TABLE 4

| Comparative Example | Friction coefficient | Abrasion coefficient × 10$^{-10}$ cm$^3$/kg · m | Tensile strength Kgf/cm$^2$ |
|---|---|---|---|
| 1 | 0.64 | 1050 | 430 |
| 2 | 0.48 | 600 | 400 |
| 3 | 0.14 | 140 | 320 |
| 4 | 0.27 | 210 | 385 |
| 5 | 0.19 | 130 | 340 |
| 6 | 0.26 | 135 | 375 |
| 7 | 0.21 | 120 | 320 |
| 8 | 0.28 | 285 | 380 |
| 9 | 0.51 | 720 | 390 |
| 10 | 0.54 | 610 | 400 |
| 11 | 0.66 | 800 | 430 |

EXAMPLES 15 to 29

Nylon 12 [PA 12] (2) in Examples 1 to 14, was changed to other synthetic resins as identified in Table 5. To 100 parts by weight of such a resin, various lubricating agents were blended. The softening temperature varied depending upon the synthetic resin used, and the melt-mixing condition and injection molding conditions were adjusted so that a composition having a uniform property was obtainable, whereupon the granulation and injection molding were conducted to obtain test pieces similar to those prepared in Examples 1 to 14, and the physical properties were measured. The description of the individual granulation and molding conditions is hereby omitted. However, the melt-mixing conditions were: a cylinder temperature of from 180° to 300° C. and screw rotational speed of 100 rpm. Likewise, the injection molding conditions were: a cylinder temperature of from 190° to 315° C., an injection molding pressure of from 600 to 1300 kg/cm² and a mold temperature of from 50° to 170° C. In Example 22, the test pieces were immersed in hot water of 80° C. for moisture crosslinkable, and then the physical properties were measured.

TABLE 5

| Example | Synthetic resin Type | Parts | Organopolysiloxane Type of groups contained | Parts | Fluorine-containing elastomer Type | Parts | Alkoxysilane Type | Parts |
|---|---|---|---|---|---|---|---|---|
| 15 | PE (1) | 100 | Amino groups (10) | 9 | (14) | — | — | — |
| 16 | " | 100 | " | 8 | — | — | (15) | 1.2 |
| 17 | " | 100 | Glycidyl groups (11) | 9 | (14) | 9 | — | — |
| 18 | " | 100 | " | 8 | — | — | (15) | 1.2 |
| 19 | " | 100 | Carboxyl groups (12) | 9 | (14) | 9 | — | — |
| 20 | " | 100 | " | 8 | — | — | (15) | 1.2 |
| 21 | " | 100 | Hydroxyl groups (13) | 9 | (14) | 9 | — | — |
| 22 | Moisture crosslinkable PE (17) | 100 | Amino groups (10) | 9 | (14) | 9 | — | — |
| 23 | PA 66 (17) | 100 | " | 9 | (14) | 9 | — | — |
| 24 | POM (4) | 100 | " | 9 | (14) | 9 | — | — |
| 25 | PBT (5) | 100 | " | 9 | (14) | 9 | — | — |
| 26 | PPS (6) | 100 | " | 9 | (14) | 9 | — | — |
| 27 | PEI (7) | 100 | " | 9 | (14) | 9 | — | — |
| 28 | COP (8) | 100 | " | 9 | (14) | 9 | — | — |
| 29 | PABM (9) | 100 | " | 9 | (14) | 9 | — | — |

TABLE 6

| Example | Friction coefficient | Abrasion coefficient × $10^{-10}$ cm³/kg · m | Tensile strength Kgf/cm² |
|---|---|---|---|
| 15 | 0.17 | 55 | 210 |
| 16 | 0.18 | 62 | 225 |
| 17 | 0.17 | 57 | 215 |
| 18 | 0.19 | 63 | 230 |
| 19 | 0.21 | 57 | 250 |
| 20 | 0.23 | 63 | 260 |
| 21 | 0.22 | 70 | 255 |
| 22 | 0.18 | 2 | 215 |
| 23 | 0.15 | 52 | 720 |
| 24 | 0.16 | 84 | 620 |
| 25 | 0.15 | 95 | 530 |
| 26 | 0.17 | 270 | 590 |
| 27 | 0.35 | 2200 | 880 |
| 28 | 0.21 | 113 | 440 |
| 29 | 0.18 | 53 | — |

COMPARATIVE EXAMPLES 12 to 21

Eight parts by weight of the tetrafluoroethylene resin (16) was blended to 100 parts by weight of each of the synthetic resins used in Examples 15 to 29 and Examples 1 to 14. The composition containing no fluorine-containing elastomer and no alkoxysilane, was subjected to the same operation as in Examples 15 to 29 to prepare test pieces. Then, the physical properties were measured, and the results thus obtained are shown in Table 7 together with the type of the synthetic resin used. However, in Comparative Example 13, the test pieces were immersed in hot water of 80° C. for 24 hours for moisture crosslinkable, and then the physical properties were measured.

TABLE 7

| Example | Type of synthetic resin | Friction coefficient | Abrasion coefficient × $10^{-10}$ cm/ Kg · m³ | Tensile strength Kgf/cm² |
|---|---|---|---|---|
| 12 | PE (1) | 0.21 | 145 | 225 |
| 13 | Moisture crosslinkable PE (17) | 0.28 | 165 | 235 |
| 14 | PA 66 (3) | 0.54 | 128 | 770 |
| 15 | POM (4) | 0.40 | 1000 | 660 |
| 16 | PBT (5) | 0.38 | 800 | 540 |
| 17 | PPS (6) | 0.45 | 700 | 620 |
| 18 | PEI (7) | 0.66 | 21000 | 1070 |
| 19 | COP (8) | 0.53 | 1070 | 460 |
| 20 | PABM (9) | 0.78 | 1100 | — |
| 21 | PA 12 (2) | 0.34 | 800 | 380 |

As is apparent from the measured values in Tables 2, 4, 6 and 7, when Examples 1 to 29 are compared with Comparative Examples 1 to 21, in the Comparative Examples, the deterioration of the tensile strength is substantial (e.g. Comparative Examples 3, 5 and 7) even though the friction coefficient and abrasion coefficient are relatively small, or the friction coefficient and abrasion coefficient are large (e.g. Comparative Examples 1, 2, 4, 6, 8 to 21) even if the tensile strength is maintained. In each case, the desired properties are hardly obtainable. In each of Examples 1 to 29, the friction coefficient and abrasion coefficient are both small without a deterioration of the tensile strength, thus being quite desirable. Further, the objectives such as low friction and low abrasion are accomplished without incorporation of hard fillers which used to be employed, and therefore the damage to the sliding counter substrate can be avoided during the sliding operation.

The shaped product composed of the lubricating resin composition of the present invention not only maintains the basic mechanical properties inherent to the synthetic resin as the base material, but also has excellent sliding properties as well as good moldability. Thus, it satisfies the three properties of the sliding properties, the moldability and the economical advantage at the same time, which has never been accomplished before. Therefore, it can be used for a wide range of applications where the lubricating properties and non-adhesion are required, such as applications to bearing, gears, sliding pads, rolls, medical instruments, the sliding surfaces of skies, doorsills, sliding coatings, or non-adhesion coatings. Thus, the present invention is quite valuable.

What is claimed is:

1. A resin composition having lubricating properties, which comprises:
   (i) 100 parts by weight of a synthetic resin,
   (ii) from 0.5 to 20.0 parts by weight of an organopolysiloxane, and
   (iii) from 0.5 to 20.0 parts by weight of a fluorine-containing elastomer or from 0.05 to 7.0 parts by weight of an alkoxysilane,
   wherein at least one of said organopolysiloxane, fluorine-containing elastomer and alkoxysilane has a functional group, and wherein said organopolysiloxane's functional group is a functional group selected from the group consisting of amino groups, glycidyl groups, carboxyl groups and alcoholic hydroxyl groups, said fluorine-containing elastomer's functional group is a glycidyl group and said alkoxysilane's functional group is a glycidoxy group.

2. The resin composition according to claim 1, wherein the organopolysiloxane is an organopolysiloxane having a unit containing an amino group.

3. The resin composition according to claim 1, wherein the organopolysiloxane is an organopolysiloxane having a unit containing a glycidyl group.

4. The resin composition according to claim 1, wherein the organopolysiloxane is an organopolysiloxane having a unit containing a carboxyl group.

5. The resin composition according to claim 1, wherein the organopolysiloxane is an organopolysiloxane having a unit containing an alcoholic hydroxyl group.

6. The resin composition according to claim 1, wherein the fluorine-containing elastomer is a two component copolymer composed of tetrafluoroethylene and propylene, or a three component copolymer composed of tetrafluoroethylene, propylene and glycidyl vinyl ether.

7. The resin composition according to claim 1, wherein the alkoxysilane is a trimethoxysilane containing a glycidoxy group.

8. The resin composition of claim 1, wherein said synthetic resin is at least one member selected from the group consisting of phenol resins, urea resins, melamine resin, melamine-phenol co-condensation resins, xylene-modified phenol resins, urea-guanamine co-condensation resins, amino resins, aceto-guanamine resins, melamine-guanamine resins, polyester resins, diallyl phthalate resins, xylene resins, epoxy resin, epoxy acrylate resins, silicone resins, urethane resins, polytetrafluoroethylenes, polychlorotrifluoroethylenes, tetrafluoroethylene-hexafluoropropylene copolymers, tetrafluoroethylene-perfluoroalkylvinyl ether compolymers, vinylidene fluoride resins, ethylene-chlorotrifluoroethylene copolymers, vinyl chloride resins, vinylidene chloride resins, low density polyethylenes, high density polyethylenes, ultra high molecular weight polyethylenes, chlorinated polyolefins, polypropylenes, modified-polyolefins, moisture-crosslinkable polyolefins, ethylene-vinyl acetate copolymers, ethylene-ethyl acylate copolymers, polystyrenes, ABS resins, polyamide methacrylate resins, polyacetals, polycarbonates, cellulose resins, polyvinyl alcohols, polyurethane elastomers, polyimides, polyamides, ionomer resins, polyphenylene oxides, methylpentene polymers, polyaryl sulfones, polyaryl ethers, polyphenylene sulfides, polysulfones, aromatic polyesters, polytetramethylene terephthalate, polybutylene terephthalates and thermoplastic polyester elastomers.

9. The resin composition of claim 1, wherein said organopolysiloxane is a homopolymer or a copolymer of dimethylsiloxane, methylphenylsiloxane or a methyltrifluoropropylsiloxane.

10. The resin composition of claim 1, wherein said fluorine-containing elastomer is at least one member selected from the group consisting of tetrafluoroethylene-propylene copolymers, tetrafluoroethylene-propylene copolymers comprising units containing glycidyl ether groups, perfluoroalkylperfluorovinyl ether copolymers, vinylidene fluoride-hexafluoropropylene copolymers, vinylidene fluoride-pentafluoropropylene copolymers, vinylidene fluoride-trifluorochloroethylene copolymers, tetrafluoroethylene-ethylene-isobutylene copolymers ethylene-hexafluoropropylene copolymers, tetrafluoroethylene-butene-1 copolymers and tetrafluoroethylene-ethyl vinyl ether copolymers.

11. The resin composition of claim 1, wherein said fluorine-containing elastomer is a polymer comprising from 4 to 70 mole % of tetrafluoroethylene and from 30 to 60 mole % of of propylene, or said fluorine-containing elastomers a copolymer comprising from 50 to 90 mole % of vinylidene fluoride, from 10 to 50 mole % of hexafluoropropylene and from 0 to 30 mole % of tetrafluoroethylene, or said fluorine-containing elastomer as a copolymer comprising from 30 to 90 mole % of tetrafluoroethylene and from 10 to 70 mole % of perfluoroalkyl perfluorovinyl ether, or said fluorine-containing elastomer as a copolymer comprising from 50 to 90 mole % of vinylidene fluoride and from 10 to 50 mole % of pentafluoropropylene.

12. The resin composition of claim 1, wherein the glycidyl group of said fluorine-containing elastomer is derived from glycidyl vinyl ether, glycidyl acrylate, acrylic acid, methacrylic acid, or 2-chloroethylvinyl ether.

13. The resin composition of claim 1, wherein said alkoxy silane is γ-glycidoxypropyltrimethoxysilane.

14. The resin composition of claim 1, wherein said organopolysiloxane is present in an amount of from 5 to 15 parts by weight.

15. The resin composition of claim 1, wherein said fluorine-containing elastomer is present in amount of from 5 to 15 parts by weight.

16. The resin composition of claim 1, wherein said alkoxysilane is present in an amount of from 1 to 5 parts by weight.

17. The resin composition of claim 1, further comprising a releasing agent, a flame retardant, or a weather-resistance-improving agent.

18. The resin composition of claim 1, wherein said composition further comprises a tetrafluoroethylene resin powder, graphite, a fluorinated graphite, talc, boron nitride, fluorine oil or silicone oil.

19. The resin composition of claim 1, further comprising a glass fiber, a carbon fiber, an aluminum fiber, asbestos, rock wool, glass powder, talc, clay or calcium carbonate.

* * * * *